(12) United States Patent
Que et al.

(10) Patent No.: US 9,039,267 B2
(45) Date of Patent: May 26, 2015

(54) ALUMINUM EXTRUSION HEAT SINK STRUCTURE AND CORRESPONDING BACKLIGHT MODULE

(75) Inventors: Chengwen Que, Shenzhen (CN); Shih-Hsiang Chen, Shenzhen (CN); Jiaqiang Wang, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 3 days.

(21) Appl. No.: 13/639,471

(22) PCT Filed: Jun. 7, 2012

(86) PCT No.: PCT/CN2012/076550
§ 371 (c)(1),
(2), (4) Date: Oct. 4, 2012

(87) PCT Pub. No.: WO2013/170509
PCT Pub. Date: Nov. 21, 2013

(65) Prior Publication Data
US 2013/0308340 A1    Nov. 21, 2013

(30) Foreign Application Priority Data

May 16, 2012 (CN) .......................... 2012 1 0151285

(51) Int. Cl.
*B60Q 1/06* (2006.01)
*F21V 29/00* (2006.01)
*F21V 7/04* (2006.01)
*G02F 1/1335* (2006.01)
*F21V 8/00* (2006.01)
*G02F 1/1333* (2006.01)

(52) U.S. Cl.
CPC ........ G02F 1/133615 (2013.01); G02B 6/0085 (2013.01); *G02F 2001/133314* (2013.01); *G02F 2001/133628* (2013.01); *G02B 6/0091* (2013.01)

(58) Field of Classification Search
CPC .............. G02F 1/133615; G02F 2001/133314; G02F 2001/133628; G02B 6/0085; G02B 6/0091
See application file for complete search history.

(56) References Cited

U.S. PATENT DOCUMENTS

2010/0066937 A1* 3/2010 Yamashita et al. .............. 349/58
2011/0292682 A1* 12/2011 Yu et al. ......................... 362/609

* cited by examiner

*Primary Examiner* — Donald Raleigh
(74) *Attorney, Agent, or Firm* — Kirton McConkie; Evan R. Witt

(57) ABSTRACT

The present invention relates to an aluminum extrusion heat sink structure and a corresponding backlight module. The aluminum extrusion heat sink structure comprises a light source connecting portion, a back plate connecting portion and a light guide plate support portion. The manufacture cost of the aluminum extrusion heat sink structure is lower, and the heat dissipation effect is better, so as to solve the technology problem that the volume of a traditional aluminum extrusion heat sink structure is larger caused the cost of the aluminum extrusion heat sink structure and the corresponding backlight module is higher.

3 Claims, 2 Drawing Sheets

ALUMINUM EXTRUSION HEAT SINK STRUCTURE AND CORRESPONDING BACKLIGHT MODULE

FIELD OF THE INVENTION

The present invention relates to a field of packing technology, and more particularly to an aluminum extrusion heat sink structure and a corresponding backlight module with low cost.

BACKGROUND OF THE INVENTION

With the rapid advancement and development of liquid crystal display technology, more and more people begin to use liquid crystal display (LCD) device, so as to satisfy a request of better image quality. The LCD device comprises a display panel and a backlight module. A former backlight module uses a cold cathode fluorescent lamp (CCFL) as a light source. However, with the development of light emitting diode (LED) technology, an LCD light source has advantages of low energy consumption and long life, so that the CCFL used in backlight module is gradually replaced by the LED light source.

However, the luminous efficiency of the LED light source is greatly influenced by a working temperature thereof. Hence, designers generally design an aluminum extrusion heat sink structure in a backlight module for heat dissipation of the LED light source. As shown in FIG. 1, a structural schematic view of a traditional backlight module is illustrated in FIG. 1. In the figure, a backlight module comprises a light guide plate 10, an LED light bar 11, a aluminum extrusion heat sink structure 12, a reflecting sheet 13 and a back plate 14, wherein the LED light bar 11 is fixed onto the aluminum extrusion heat sink structure 12, and the heat produced from the LED light bar 11 is take away by the aluminum extrusion heat sink structure 12.

Because the aluminum extrusion heat sink structure 12 also needs to support the light guide plate 10 and the reflecting sheet 13, the aluminum extrusion heat sink structure 12 has a larger volume, and consumes more aluminum material, so that it causes a higher cost of the aluminum extrusion heat sink structure 12.

As a result, it is necessary to provide an aluminum extrusion heat sink structure and a corresponding backlight module to solve the problems existing in the conventional technologies.

SUMMARY OF THE INVENTION

One of the objects of the present invention is to provide a aluminum extrusion heat sink structure of low cost, and the heat dissipation effect is better, so as to solve the technology problem that the volume of a traditional aluminum extrusion heat sink structure is larger caused the cost of the aluminum extrusion heat sink structure and the corresponding backlight module is higher.

To solve above-mentioned problem, the present invention is provided with technical solutions, as follows:

The present invention relates to an aluminum extrusion heat sink structure, comprising:

a light source connecting portion connected with a light emitting diode (LED) light source;

a back plate connecting portion connected with the light source connecting portion and has a surface contact with a back plate; and a light guide plate support portion which is forward to a direction of the light guide plate, projects from the back plate connecting portion, is used to support the light guide plate, and comprises:

a contact member which is used to support the light guide plate, and has a surface contact with the light guide plate; and a support member which is used to connect with the contact member and the back plate connecting portion;

wherein a contact area between the contact member of the light guide plate support portion and the light guide plate is larger than a horizontal cross section area of the support member of the light guide plate support portion, and the horizontal cross section of the support member is parallel to a light-out plane of the light guide plate; and wherein a plurality of fin heat dissipation units is disposed on the contact member of the light guide plate support portion, and the fin heat dissipation units contact with the light guide plate.

In the aluminum extrusion heat sink structure of the present invention, the light guide plate support portion is formed as an upside-down "L" shape.

In the aluminum extrusion heat sink structure of the present invention, the light guide plate support portion is formed as a hollow trapezoid.

In the aluminum extrusion heat sink structure of the present invention, a reflecting sheet is disposed between the light guide plate support portion and the light guide plate.

The present invention further relates to an aluminum extrusion heat sink structure, comprising:

a light source connecting portion connected with an LED light source;

a back plate connecting portion connected with the light source connecting portion and has a surface contact with a back plate; and a light guide plate support portion which is forward to a direction of the light guide plate, projects from the back plate connecting portion, is used to support the light guide plate.

In the aluminum extrusion heat sink structure of the present invention, the light guide plate support portion comprising:

a contact member which is used to support the light guide plate, and has a surface contact with the light guide plate; and a support member which is used to connect with the contact member and the back plate connecting portion.

In the aluminum extrusion heat sink structure of the present invention, a contact area between the contact member of the light guide plate support portion and the light guide plate is larger than a horizontal cross section area of the support member of the light guide plate support portion, and the horizontal cross section of the support member is parallel to a light-out plane of the light guide plate.

In the aluminum extrusion heat sink structure of the present invention, a plurality of fin heat dissipation units is disposed on the contact member of the light guide plate support portion, and the fin heat dissipation units contact with the light guide plate.

In the aluminum extrusion heat sink structure of the present invention, the light guide plate support portion is formed as an upside-down "L" shape.

In the aluminum extrusion heat sink structure of the present invention, the light guide plate support portion is formed as a hollow trapezoid.

In the aluminum extrusion heat sink structure of the present invention, a reflecting sheet is disposed between the light guide plate support portion and the light guide plate.

The present invention further relates to a backlight module, comprising:

an LED light source used to supply a backlight light source to a corresponding display panel;

a light guide plate disposed at one side of a light-out surface of the LED light source;

a back plate used to install the LED light source and the light guide plate 20 thereon; and an aluminum extrusion heat sink structure, which comprises:

a light source connecting portion connected with an LED light source;

a back plate connecting portion connected with the light source connecting portion and has a surface contact with a back plate; and a light guide plate support portion which is forward to a direction of the light guide plate, projects from the back plate connecting portion, is used to support the light guide plate.

In the backlight module of the present invention, the light guide plate support portion comprising:

a contact member which is used to support the light guide plate, and has a surface contact with the light guide plate; and a support member which is used to connect with the contact member and the back plate connecting portion.

In the backlight module of the present invention, a contact area between the contact member of the light guide plate support portion and the light guide plate is larger than a horizontal cross section area of the support member of the light guide plate support portion, and the horizontal cross section of the support member is parallel to a light-out plane of the light guide plate.

In the backlight module of the present invention, a plurality of fin heat dissipation units is disposed on the contact member of the light guide plate support portion, and the fin heat dissipation units contact with the light guide plate.

In the backlight module of the present invention, the light guide plate support portion is formed as an upside-down "L" shape.

In the backlight module of the present invention, the light guide plate support portion is formed as a hollow trapezoid.

In the backlight module of the present invention, a reflecting sheet is disposed between the light guide plate support portion and the light guide plate.

In comparison with a existing aluminum extrusion heat sink structure and a corresponding backlight module, the aluminum extrusion heat sink structure and the corresponding backlight module according to the present invention separate the contact member for heat dissipation of the light guide plate and the support member for support of the light guide plate, so as to decrease the use quantity of aluminum material. The manufacture cost of the aluminum extrusion heat sink structure is lower, and the heat dissipation effect is better, so as to solve the technology problem that the volume of a traditional aluminum extrusion heat sink structure is larger caused the cost of the aluminum extrusion heat sink structure and the corresponding backlight module is higher.

For above-mention contents of the present invention can be best understood by referring to the following detailed description of the preferred embodiments and the accompanying drawings.

Figure 1:
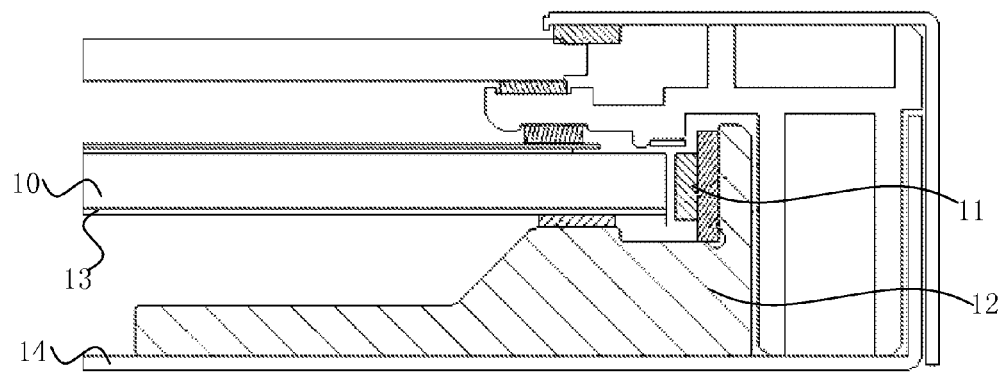
FIG. 1 is a structural schematic view of a traditional backlight module.

In the drawings, the terms and numerals are listed, as follows:

20, light guide plate;
21, LED light source;
22, aluminum extrusion heat sink structure;
221, light source connecting portion;
222, back plate connecting portion;
223, 323, 423 light guide plate support portion;
2231, 3231, 4231, contact member;
2232, 3232, support member;
23, reflecting sheet;
24, back plate; and
25, display panel.

DETAILED DESCRIPTION OF THE PREFERRED EMBODIMENTS

The description of the preferred embodiments refers to the drawings, so as to illustrate the specific embodiments of the present invention which can be carried out. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

In the drawings, the units with the similar structure use the same numerals.

Figure 2:
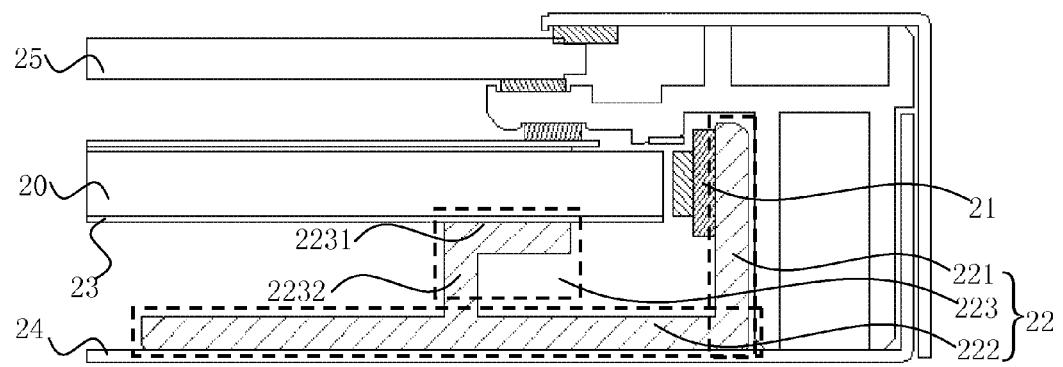
FIG. 2 is a structural schematic view of a backlight module of a first preferred embodiment according to the present invention.

Referring now to FIG. 2, a structural schematic view of a backlight module of a first preferred embodiment according to the present invention is illustrated in FIG. 2. A backlight module comprises a light emitting diode (LED) light source 21, a light guide plate 20, a back plate 24 and a aluminum extrusion heat sink structure 22, wherein the LED light source 21 is used to supply a backlight light source to a corresponding display panel 25; the light guide plate 20 is disposed at one side of a light-out surface of the LED light source 21, so as to guide lights of the LED light source 21; and the back plate 24 is used to install the LED light source 21 and the light guide plate 20 thereon.

In this embodiment, the aluminum extrusion heat sink structure 22 comprises a light source connecting portion 221, a back plate connecting portion 222 and a light guide plate support portion 223. The light source connecting portion 221 is connected with the LED light source 21; the back plate connecting portion 222 is connected with the light source connecting portion 221 and has a surface contact with the back plate 24, simultaneously; the light guide plate support portion 223 is forward to a direction of the light guide plate 20, and projects from the back plate connecting portion 222. The light guide plate support portion 223 comprises a contact member 2231 and a support member 2232, wherein the contact member 2231 is used to support the light guide plate 20, and has a surface contact with the light guide plate 20; the support member 2232 is used to connect with the contact member 2231 and the back plate connecting portion 222.

As shown in FIG. 2, the light guide plate support portion 223 of the aluminum extrusion heat sink structure 22 is formed as an upside-down "L" shape. A contact area between the contact member 2231 of the light guide plate support portion 223 and the light guide plate 20 is larger than a horizontal cross section area of the support member 2232 of the light guide plate support portion 223, and the horizontal cross section of the support member 2232 is parallel to a light-out plane of the light guide plate 20. The larger contact surface between the contact member 2231 and the light guide plate 20 can achieve a well heat dissipation to the light guide plate 20, so at to ensure the light guide plate 20 having a normal working. The effect of the horizontal cross section area of the support member 2232 is only to support the contact member 2231, so that it can be designed as small as possible, so as to achieve an effect of saving the use of aluminum material.

In this embodiment, the LED light source 21 can be such as an LED light bar, which comprises a circuit board and emitting units (such as an LED die), wherein the circuit board is such as a printed circuit board (PCB) or a flexible printed circuits (FPC), and the emitting units are disposed on the circuit board. The LED light source 21 has a light-out surface for emitting lights into the light guide plate 20. The light-out surface is preferably be a plane, for example, formed in the surface of the emitting unit, and preferably, the light-out surface of the LED light source 21 is approximately perpendicular to a light emitting direction (i.e. a light-in direction when lights enter into the light guide plate 20).

The light guide plate 20 is such as a plate structure made by injection molding, and the material thereof is such as a photo-curing resin, polymethylmethacrylate (PMMA) or polycarbonate (PC). The light guide plate 20 comprises a light-out surface, a light reflect surface and at least one side light-in surface. The light-out surface is located at the front of light guide plate 20 for allowing lights from the light guide plate 20 emitting to the display panel 25; the light reflect surface is located at the bottom of light guide plate 20, and is corresponding to the light-out surface; and the side light-in surface of the light guide plate 20 is formed at one side or two corresponding sides of the light guide plate 20 for allowing lights emitted from the LED light source 21 entering into the light guide plate 20, and the side light-in surface is approximately perpendicular to the light-out surface.

The back plate 24 according to the present invention is made of a light-tight material, such as: plasticizing material, metal material or anyone combined by above-mentioned material.

The backlight module of this embodiment further can comprise a reflecting sheet 23, and the reflecting sheet 23 is disposed between the light guide plate support portion 223 and the light guide plate 20 (i.e. on the bottom surface of the light guide plate 20), so that the contact member 2231 indirectly has a surface contact with the light guide plate 20 by the reflecting sheet 23. The reflecting sheet 23 is such as a reflecting film or a reflecting coat layer, which is made of material with high reflectance, and is used for reflecting lights forwarding to the reflecting surface. The materials with high reflectance are such as silver, aluminum, gold, chromium, copper, indium, iridium, nickel, platinum, rhenium, rhodium, tin, tantalum, wolfram, manganese, alloy combined by any above-mention, white reflecting paint of yellow-resistant and heat-resistant, or anyone combined by above-mentioned, so as to reflect the lights. It is noteworthy, the reflecting surface of the light guide plate 20 can also coat with these high reflectance material to reflect the light-in lights, so that it can replace and omit installation of the reflecting sheet 23. In the backlight module installed with the reflecting sheet 23, the aluminum extrusion heat sink structure 22 not only be used for heat dissipation to the light guide plate 20, but also be used for heat dissipation to the reflecting sheet 23, simultaneously, so as to prevent the reflecting sheet 23 from high temperature causing warp of the reflecting sheet 23.

When the backlight module is in use, the heat produced from the LED light source 21 can through the light source connecting portion 221 of the aluminum extrusion heat sink structure 22 transmitted to the back plate connecting portion 222, and finally transmitted to the back plate 24. The light source connecting portion 221 is disposed at the bottom of the LED light source 21, so as to insure the maximum contact area between the aluminum extrusion heat sink structure 22 and the LED light source 21, and achieve the best heat dissipation effect. In a process of light transmission, the heat produced from the light guide plate 20 can through the contact member 2231 of the light guide plate support portion 223 transmitted to the support member 2232 of the light guide plate support portion 223, and finally to the back plate 24. The larger contact area (here namely, direct contact surface or indirect contact surface) between the contact member 2231 and the light guide plate 20 achieves the best heat dissipation effect to the light guide plate 20 and reflecting sheet 23 disposed at the bottom of the light guide plate 20. Simultaneously, the backlight module according to the present invention can substantially save the manufacture cost of the aluminum extrusion heat sink structure 22.

Referring to Tab. 1, Tab. 1 is a contrast table of a backlight module of traditional technology and a backlight module of the first preferred embodiment according to the present invention about heat dissipation effect and use quantity of aluminum material.

TABLE 1

| | Pad temperature of the LED light source (° C.) | Temperature of the contact member (° C.) | Volume of the aluminum extrusion heat sink structure (cm3) |
|---|---|---|---|
| Traditional backlight module | 59.4141 | 55.9925 | 50 |
| Improved backlight module | 59.4135 | 55.7967 | 30 |

It can be seen in Tab. 1, after using the aluminum extrusion heat sink structure 22 according to the present invention, the pad temperature of the LED light source 21 (to express the temperature of the LED light source 21) and the temperature of the contact member 2231 (to express the temperature of the light guide source 20) have a slight decrease, but not too many differences. It means that their heat dissipation effects are near. However, the volume of the aluminum extrusion heat sink structure 22 can substantially decrease. The aluminum extrusion heat sink structure 22 according to the present invention only uses 60% of use quantity of aluminum material of traditional aluminum extrusion heat sink structure, so as to substantially decrease the manufacture cost of the aluminum extrusion heat sink structure 22.

Figure 3:
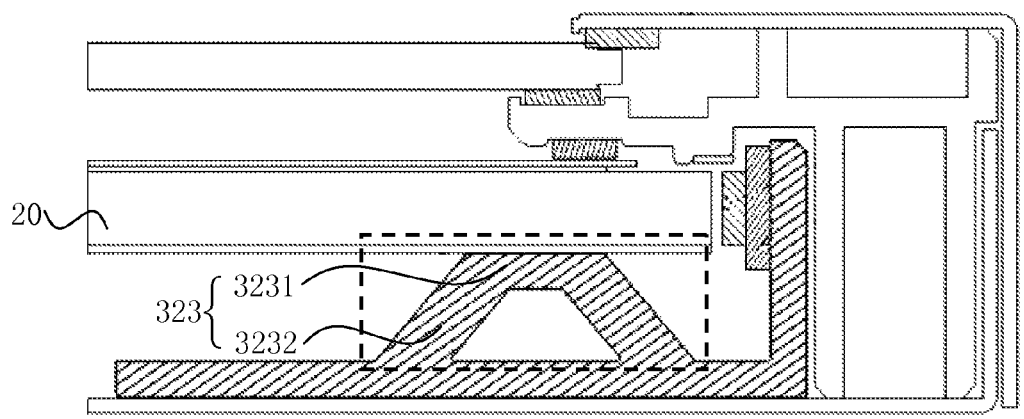
FIG. 3 is a structural schematic view of a backlight module of a second preferred embodiment according to the present invention.

Referring now to FIG. 3, a structural schematic view of a backlight module of a second preferred embodiment according to the present invention is illustrated in FIG. 3. The difference between this preferred embodiment and the first preferred embodiment is that: a light guide plate support portion 323 is formed as a hollow trapezoid. The contact area of such structure of the contact member 3231 of the light guide plate support portion 323 with the light guide plate 20 is still larger than a horizontal cross section area of the support member 3232 of the light guide plate support portion 323, so that it can achieve ensuring the effect of heat dissipation and saving aluminum material. Besides, the stability of the hollow trapezoid is better, so as to ensure the effective surface contact between the contact member 3231 and the light guide plate 20.

Figure 4:
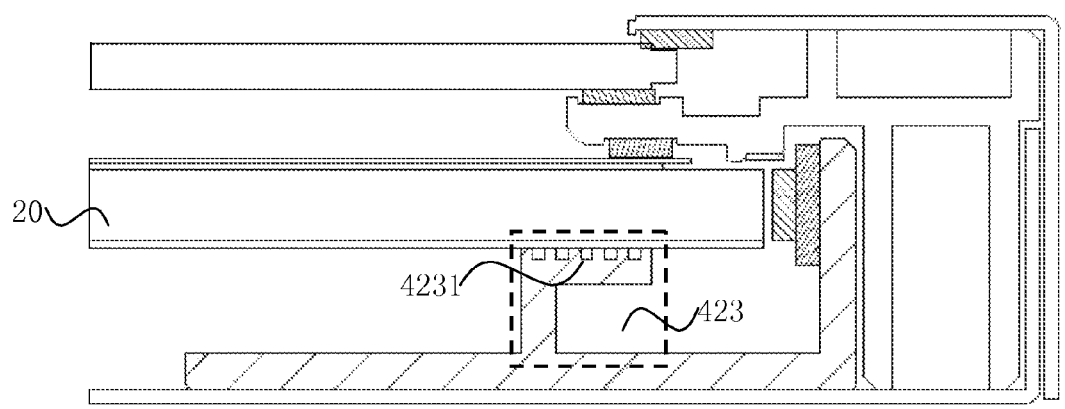
FIG. 4 is a structural schematic view of a backlight module of a third preferred embodiment according to the present invention.

Referring now to FIG. 4, a structural schematic view of a backlight module of a third preferred embodiment according to the present invention is illustrated in FIG. 4. The difference between this preferred embodiment and the first preferred embodiment is that: a plurality of fin heat dissipation units is disposed on the contact member 4231 of the light guide plate support portion 423, and the fin heat dissipation units contact with the light guide plate 20. The design of the fin heat dissipation units can further decrease the use quantity of aluminum material of the aluminum extrusion heat sink structure 22, and the fin heat dissipation units can further increase heat dissipation effect between the contact member 4231 and the light guide plate 20. Certainly, the fin heat dissipation units are disposed on the contact member 4231 of the light guide plate support portion 423 with other shape, and it also can save the aluminum material and enhance the technology effect of heat dissipation.

The aluminum extrusion heat sink structure and the corresponding backlight module according to the present invention separate the contact member for heat dissipation of the light guide plate and the support member for support of the light guide plate, so as to decrease the use quantity of aluminum material. The manufacture cost of the aluminum extrusion heat sink structure is lower, and the heat dissipation effect is better, so as to solve the technology problem that the volume of a traditional aluminum extrusion heat sink structure is larger caused the cost of the aluminum extrusion heat sink structure and the corresponding backlight module is higher.

As described above, the present invention has been described with a preferred embodiment thereof and it is understood that many changes and modifications to the described embodiment can be carried out without departing from the scope and the spirit of the invention that is intended to be limited only by the appended claims.

The invention claimed is:

1. An aluminum extrusion heat sink structure, comprising:
 a light source connecting portion connected with a light emitting diode (LED) light source;
 a back plate connecting portion connected with the light source connecting portion and has a surface contact with a back plate; and
 a light guide plate support portion which is forward to a direction of the light guide plate, projects from the back plate connecting portion, is used to support the light guide plate, and comprises:
  a contact member which is used to support the light guide plate, and has a surface contact with the light guide plate; and
  a support member which is used to connect with the contact member and the back plate connecting portion;
 wherein the light guide plate support portion is formed as a hollow trapezoid;
 wherein a contact area between the contact member of the light guide plate support portion and the light guide plate is larger than a horizontal cross section area of the support member of the light guide plate support portion, and the horizontal cross section of the support member is parallel to a light-out plane of the light guide plate; and
 wherein a plurality of fin heat dissipation units is disposed on the contact member of the light guide plate support portion, and the fin heat dissipation units contact with the light guide plate; and
 wherein the light source connecting portion, the back plate connecting portion and the light guide plate support portion are formed as a single aluminum extrusion heat sink structure which is disposed on and separated from the back plate.

2. The aluminum extrusion heat sink structure according to claim 1, wherein the light guide plate support portion is formed as an upside-down "L" shape.

3. The aluminum extrusion heat sink structure according to claim 1, wherein a reflecting sheet is disposed between the light guide plate support portion and the light guide plate.

* * * * *